(12) United States Patent
Yamane et al.

(10) Patent No.: US 6,213,677 B1
(45) Date of Patent: Apr. 10, 2001

(54) JOINT MECHANISM FOR MOWING MACHINE (75) Inventors: Yoshiro Yamane, Akashi; Tsuneyoshi Yuasa, Kobe; Kazuhiko Takemoto; Tadao Yashirodai, both of Kakogawa, all of (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/185,462

(22) Filed: Nov. 3, 1998

(30) Foreign Application Priority Data

Dec. 26, 1997 (JP) .................................................. 9-360371

(51) Int. Cl.⁷ ...................................................... A01G 3/06
(52) U.S. Cl. ......................... 403/329; 403/372; 403/225; 30/276; 56/12.7
(58) Field of Search ..................................... 403/329, 326, 403/344, 372, 366, 365, 225, 228; 56/127; 30/276

(56) References Cited

U.S. PATENT DOCUMENTS

| 4,491,184 | * | 1/1985 | Kawaharazuka | 30/276 X |
| 4,505,040 | * | 3/1985 | Everts | 56/12.7 X |
| 4,586,322 | * | 5/1986 | Yokocho et al. | 56/12.7 |
| 4,655,032 | * | 4/1987 | Tanaka | 56/12.7 |
| 4,714,447 | | 12/1987 | Hironaka . | |
| 4,817,738 | | 4/1989 | Dorner et al. . | |
| 5,417,511 | * | 5/1995 | Warden | 403/365 |
| 5,641,237 | * | 6/1997 | Albert et al. | 403/372 |
| 5,774,993 | * | 7/1998 | Schlessmann | 30/276 |
| 5,855,069 | * | 1/1999 | Matsubayashi et al. | 56/12.7 X |
| 6,006,434 | * | 12/1999 | Templeton et al. | 30/276 X |

FOREIGN PATENT DOCUMENTS

| 0233572 | 8/1987 | (EP) . |
| 2531157 | 8/1983 | (FR) . |
| 2603156 | 7/1987 | (FR) . |
| 2241767 | 9/1991 | (GB) . |
| HII621296 | 6/1994 | (JP) . |

* cited by examiner

Primary Examiner—Lynne H. Browne
Assistant Examiner—David Bochna (57) ABSTRACT

A joint mechanism for a mowing machine which can be easily assembled and disassembled, including a support member of a casing which houses a cylindrical damper, which prevents vibration of a power unit from being transmitted to a rod, a holder in which the rod is inserted, and a clamp, which clamp prevents the damper and the holder from unintentionally separating from the support member, being inserted therein. The clamp has a flexible arm which extends in the direction of an output shaft of a power unit, and an engagement hook is formed on the tip of the arm. An engagement hole which the engagement hook of the clamp engages is provided on the support member.

5 Claims, 6 Drawing Sheets

JOINT MECHANISM FOR MOWING MACHINE

BACKGROUND OF INVENTION

1. Field of the Invention

The present invention relates to a joint mechanism between a power unit and a working unit of a mowing machine, such as a brush cutter, or a trimmer.

2. Description of the Related Art

Figure 6:
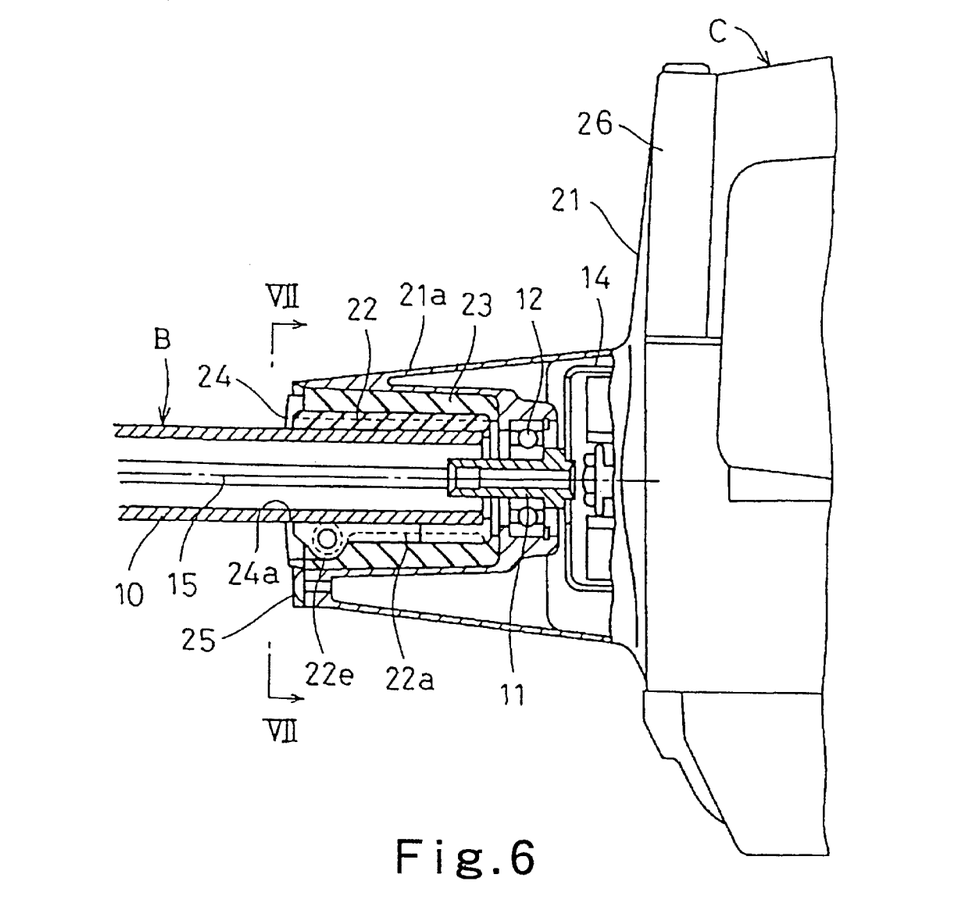
FIG. 6 is a longitudinal sectional view showing the joint mechanism for mowing machine of the prior art.

Mowing machines of the prior art having large total lengths include those which are divided into a power unit (for example, an engine) and a working unit (in a brush cutter, for example, a rod provided with a cutting blade which is rotatably mounted on the end thereof), which can be freely joined and detached. This is so that the mowing machine can be stored or carried easily. A representative configuration of a joint provided in such a mowing machine which can be freely separated and joined is shown in the longitudinal sectional view of FIG. 6 (Japanese Utility Model Publication No. 6-21296). In FIG. 6, C denotes a power unit comprising an engine and B denotes a working unit with a cutting blade (not shown) mounted on the end thereof via a rod 10.

In this configuration of a joint mechanism a casing 21 for a power output section is formed at a protruding side of an output shaft 11 as a part of an engine cover 26 of the power unit C, and the casing 21 has a support member 21a of cylindrical configuration which extends in the axial direction. A holder 22 of cylindrical configuration wherein a rod 10 is mounted is supported by the support member 21a via a cylindrical damper 23 which prevents vibration of the power unit C from being transmitted to the rod 10. In order to prevent the holder 22 and the damper 23 from unintentionally separating from the support member 21a of the casing, a lid member 24, which has an opening 24a formed at the center thereof to allow the rod 10 and a drive shaft 15 to penetrate therethrough, is attached to the end face of the support member 21a on the side of working unit B in the axial direction, (on left-hand side in FIG. 6) by means of a plurality of screws 25.

Figure 7:
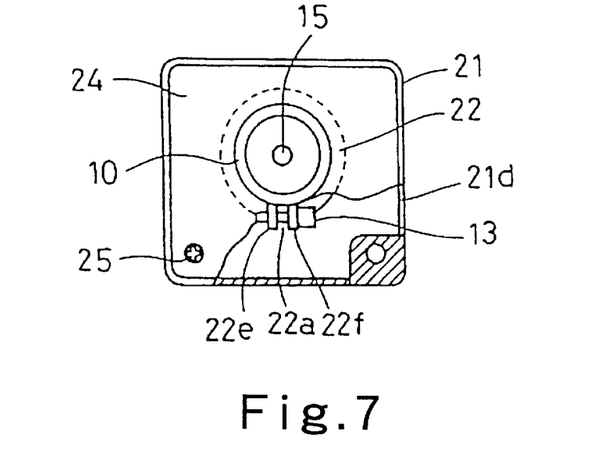
FIG. 7 is a view in the direction of VII—VII of FIG. 6.

The holder 22 has a slit 22a formed in the axial direction and flanges 22e, 22f are formed adjacent the slit 22a on both sides thereof as shown in FIG. 7 (view in line VII—VII of FIG. 6). A bolt 13 which is set in a through hole formed in the flange 22f is screwed into a threaded hole formed in the flange 22e, thereby to hold the rod 10 detachably onto the holder 22. The casing 21 has an opening 21d formed therein to face the flanges 22e, 22f inwardly, so that the bolt 13 can be attached, detached and turned from the opening 21d.

As shown in FIG. 6, the support member 21a of the casing rotatably supports an output shaft 11 which is linked to a clutch drum 14 of the engine via a bearing 12 on the side of the power unit C in the axial direction of the support member 21a, namely on a base end side (on right-hand side of the support member 21a in FIG. 6). The output shaft 11 is made in a hollow shape, while the base end of the drive shaft 15 which is arranged rotatably in the rod 10 is linked to the output shaft 11 by means of a spline or the like in the hollow space to rotate together with the output shaft 11.

In a joint mechanism of such a configuration as described above, however, assembling and disassembling of the joint mechanism requires it to attach or detach the lid member 24 onto or from the casing 21 by handling the plurality of screws 25, thus making the operation tedious.

SUMMARY OF THE INVENTION

The present invention has been accomplished to solve the problem of the prior art described above, and an object of the present invention is to provide a joint mechanism of a mowing machine which allows easy assembly and disassembly.

In order to achieve the object described above, this invention contemplates a joint mechanism for a mowing machine comprising a cylindrical support member formed on a casing of a power output section formed adjacent a protruding side of an output shaft of a power unit and extending in the axial direction. The invention also contemplates a cylindrical holder inserted in the support member, and a rod which is inserted in the holder and is held by clamping the holder, wherein a cylindrical damper which prevents vibration of the power unit from being transmitted to the rod, the holder, and a clamp which prevents the damper and the holder from unintentionally separating from the support member are inserted in the support member; and the clamp has a flexible arm extending in the axial direction and an engagement hook formed at an end of the arm; and the support member has an engagement hole to which the engagement hook of the clamp engages.

According to this joint mechanism of the mowing machine, the joint mechanism can be assembled simply by inserting the clamp together with the holder and the damper into the support member of the casing and engaging the engagement hook of the clamp with the engagement hole. Also the joint mechanism can be disassembled simply by releasing the engagement, thus making easier to assemble and disassemble the joint mechanism.

In accordance with this invention the support member can have an engaging portion for positioning of the damper in the circumferential direction formed on the inner surface of the support member. An engaged portion for positioning in the circumferential direction, which fits therein, can be formed on the outer surface of the damper. A recess for positioning of the clamp in the circumferential direction wherein the arm of the clamp fits in the axial direction can be formed on the outer surface of the damper. According to this configuration, because the arm of the clamp is positioned while being fastened in the circumferential direction with respect to the support member of the casing via the damper, the engagement hook of the clamp can be easily engaged with the engagement hole of the support member. This thereby makes it even more easy to assemble the joint mechanism.

In accordance with the invention the damper can have an engaging portion for positioning of the holder in the circumferential direction and in the axial direction formed on the inner surface of the damper, and an engaged portion for positioning in the circumferential direction and in the axial direction which fits therein can be formed on the outer surface of the holder. According to this configuration, because the holder is positioned while being fastened both in the circumferential direction and axial direction onto the damper and is integrally combined with the damper, the damper can be easily pulled out of the support member of the casing together with the holder when disassembling the joint mechanism. When the damper is positioned in the circumferential direction with respect to the support member as mentioned above, the holder is also positioned in the circumferential direction with respect to the support member via the damper, and therefore the holder is positioned in the circumferential direction with respect to the support member, namely the casing, thereby making it more easy to assemble the joint mechanism.

In accordance with the invention the holder can have a relief hole formed therein so that, in case the arm is deflected inwardly when the engagement hook of the clamp engages with the engagement hole of the support member, a portion of the damper which makes contact with the arm can be deflected inwardly in the relief hole. According to this configuration, because the arm can easily deflect inwardly due to the relief hole being formed in the holder, the engagement hook of the clamp can be easily engaged in the engagement hole of the support member and released therefrom, thereby making it more easy to assemble and disassemble the joint mechanism.

In accordance with this invention an engagement lock projection, of which a protruding end face becomes substantially flush with the outer surface of the rod when engaged in the relief hole and the rod can be inserted, is formed on the inner surface of the damper. According to this configuration, because it becomes difficult for the arm to deflect inwardly when the rod is inserted because the protruding end face of the engagement lock projection on the inner surface of the damper becomes substantially flush with the outer surface of the rod, the engagement hook of the clamp is less likely to come off the engagement hole of the support member. This results in making the assembly of the joint mechanism and holding of the rod in the support member more secure.

DETAILED DESCRIPTION OF THE PREFERRED EMBODIMENT(S)

Figure 1:
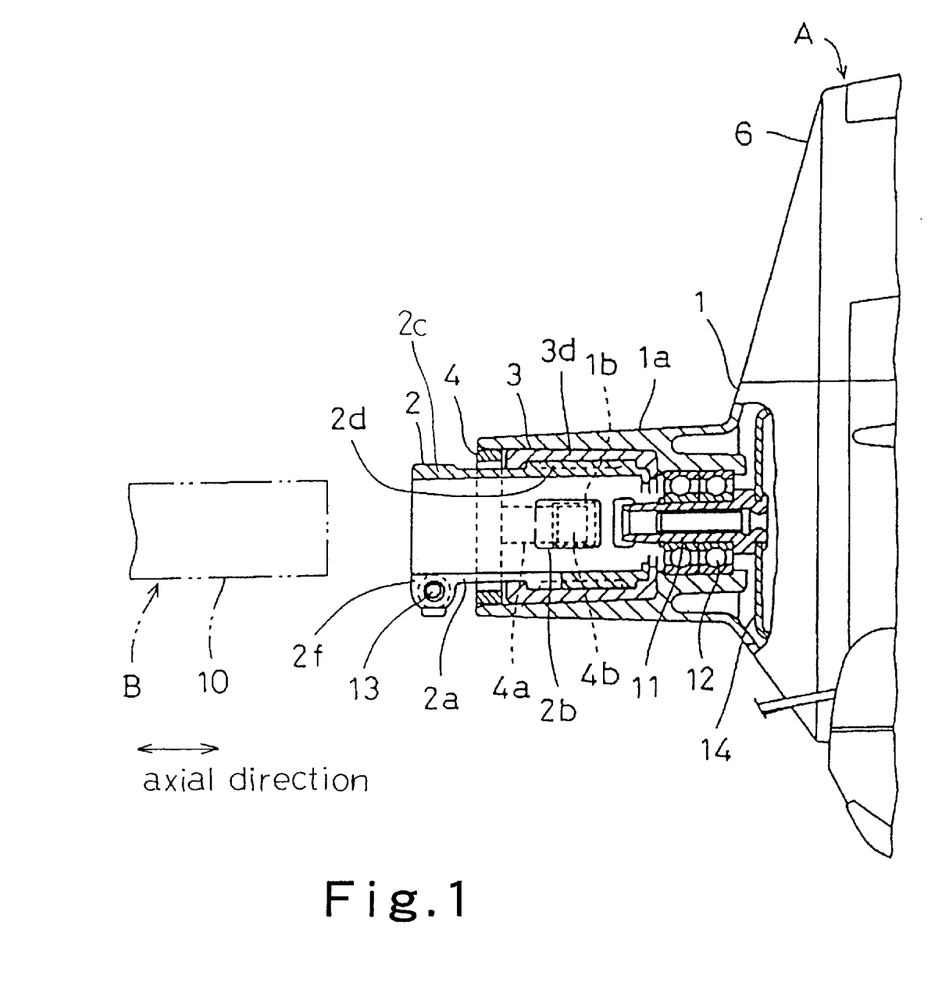
FIG. 1 is a longitudinal sectional view showing the joint mechanism for a mowing machine according to one embodiment of the present invention.
Figure 2:
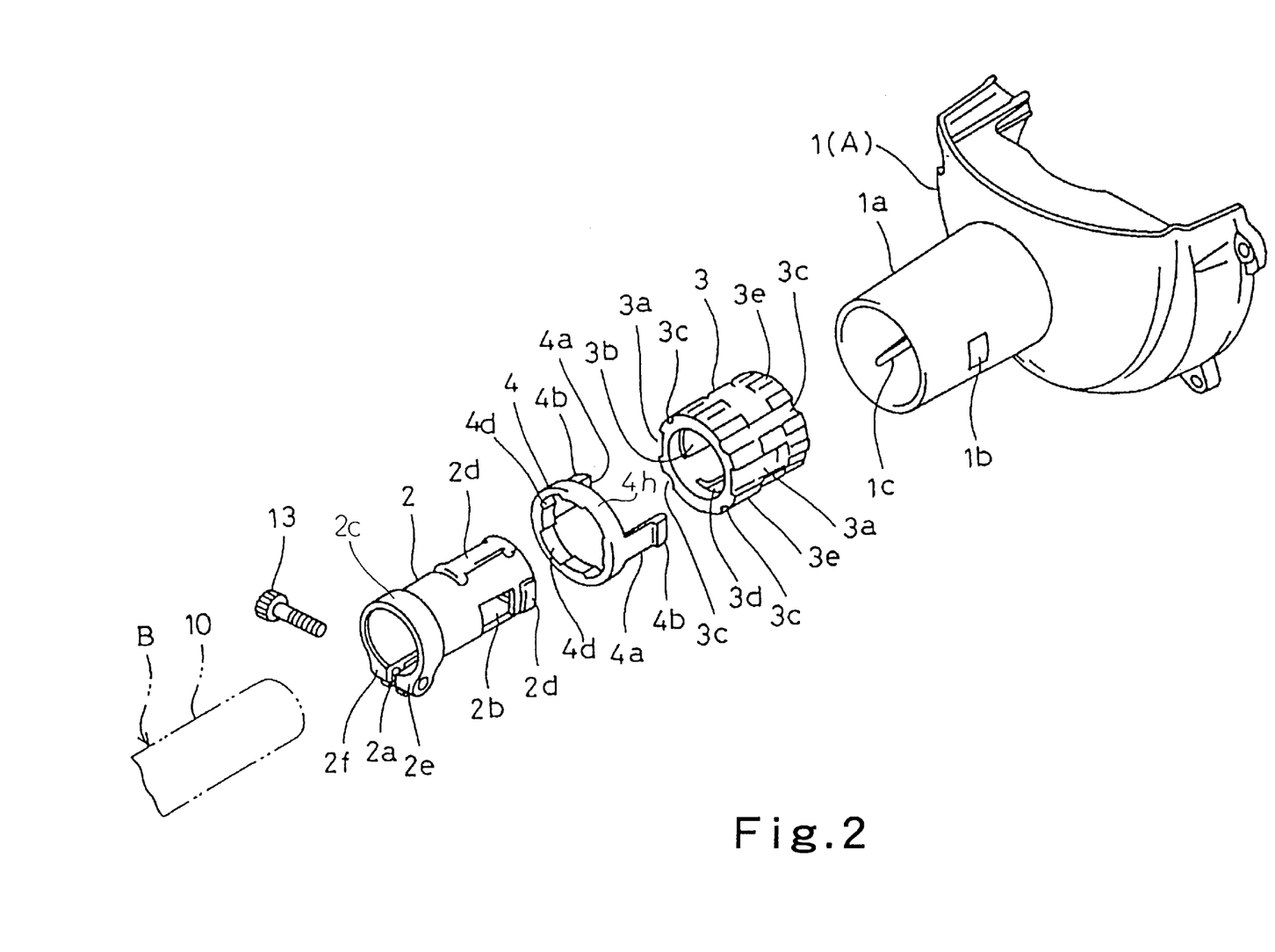
FIG. 2 is an exploded view of the joint mechanism.
Figure 5:
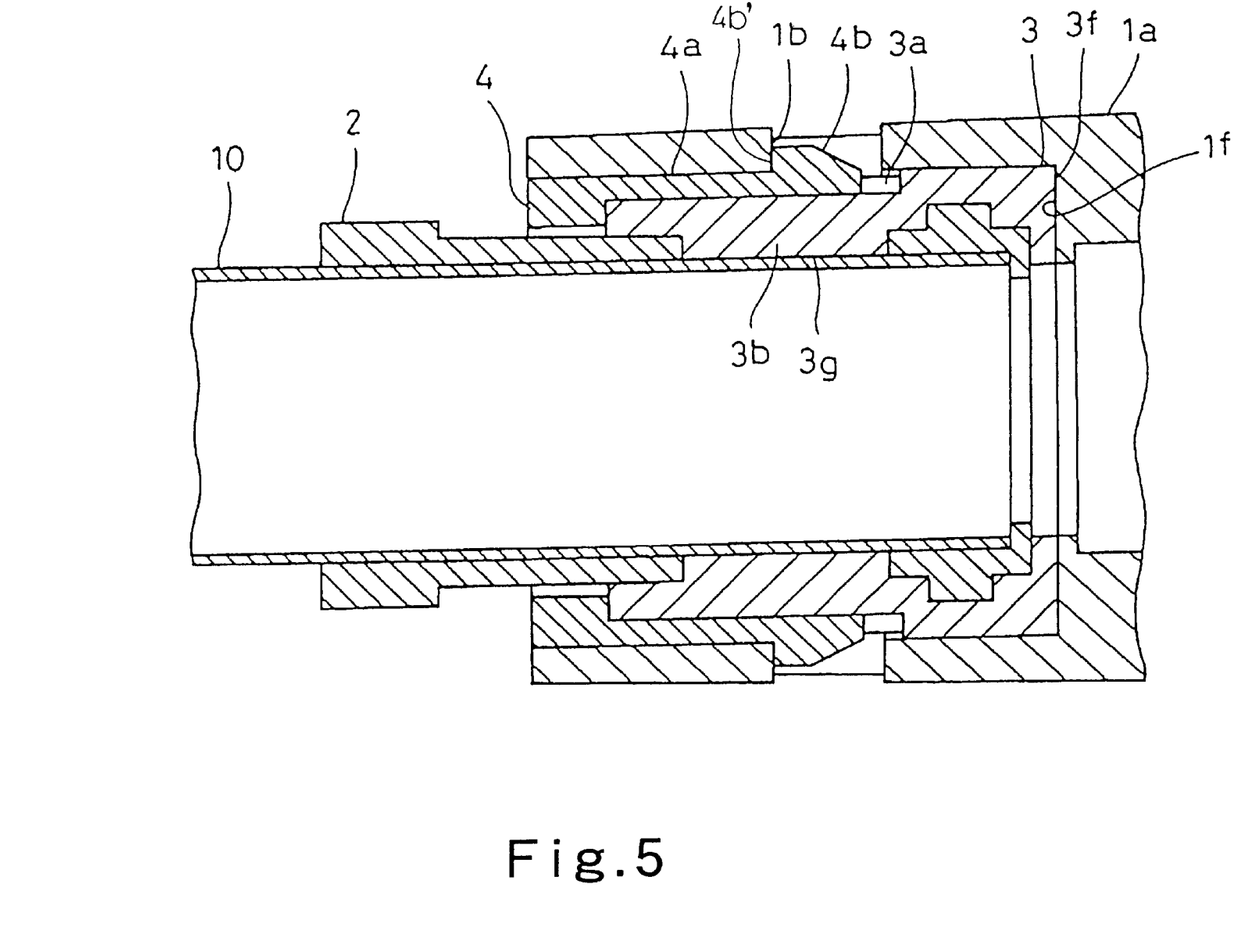
FIG. 5 is a horizontal sectional view showing the state of the assembly of the joint mechanism completed with the rod inserted.

A joint mechanism for a mowing machine according to one embodiment of the present invention will be described below with reference to the accompanying drawings. First, the configuration of the joint mechanism will be described. In this configuration of the joint mechanism, as shown in the longitudinal sectional view of FIG. 1, a casing (clutch case) 1 for a power output section is formed on a protruding side of an output shaft 11 as a part of an engine cover 6 of a power unit A, and the casing 1 has a support member 1a of cylindrical configuration which extends in an axial direction E. A holder 2 of cylindrical configuration having a slit 2a formed therein in the axial direction is inserted in the support member 1a along with and by means of a damper 3. A rod 10 of a working unit B is inserted in the holder 2 and fastened by clamping the holder 2. The joint mechanism includes the casing 1, the holder 2 inserted in the support member 1a thereof, the damper 3, and a clamp 4, as shown in the exploded view of FIG. 2. In FIGS. 1, 2 and 5, a drive shaft provided in the rod 10 is omitted.

The damper 3 is made of rubber in cylindrical configuration, and has a purpose of preventing vibration of the power unit A from being transmitted to the rod 10 of the working unit B. The clamp 4 is made of resin and has a pair of flexible arms 4a which in the illustrated example radially oppose each other and extend from the ring-shaped body 4h in the axial direction. An engagement hook 4b is formed on the outside (the side on which the arm 4a makes contact with the inner surface of the support member 1a) of the tip of the arm 4a, for the purpose of preventing the damper 3 and the holder 2 from unintentionally separating from the support member 1a. The support member 1a has a commensurate pair of engagement holes (through holes) 1b formed therein for the engagement hook 4b of the clamp 4 to engage with.

Figure 3:
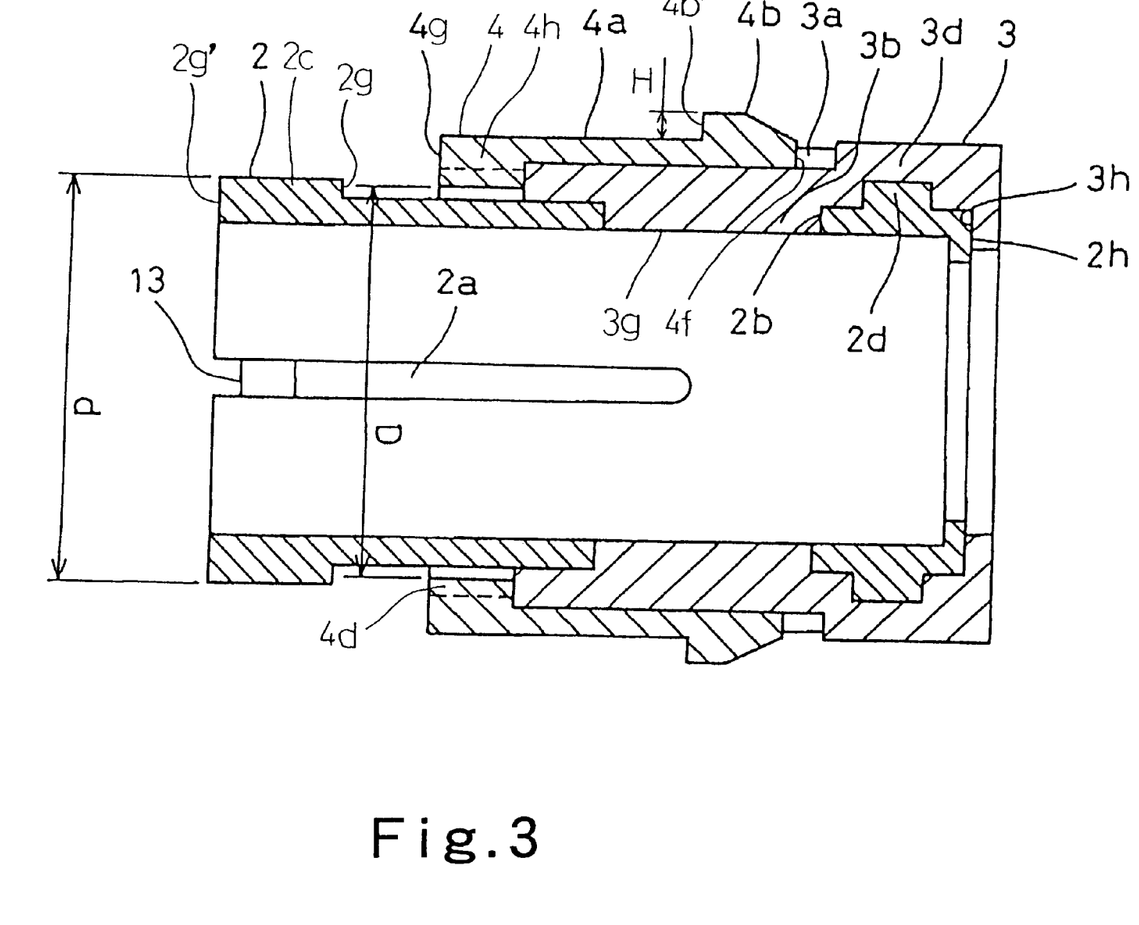
FIG. 3 is a horizontal sectional view showing the state of assembling the joint mechanism before the clamp and other parts are inserted into the support member.

The support member 1a has, for example, four projections (engaging portions) 1c (only one thereof is shown in the drawing) for positioning of the damper 3 in the circumferential direction being formed on the inner surface thereof distributed in the circumferential direction and extending in the axial direction; and four corresponding recesses 3c for positioning in the circumferential direction which fit therewith are formed on the outer surface of the damper 3 in groove shape. Further, a pair of recesses 3a for positioning of the clamp 4 in the circumferential direction, wherein to the arms 4a of the clamp are fitted in the axial direction, are formed on the outer surface of the damper 3. The damper 3 also has a pair (only the lower side is shown) of recesses (engaging portions) 3d formed in an I-shape as viewed in the axial direction and a pair of the recesses $3d_1$ (FIG. 3) formed in a rectangular shape for the positioning of the holder. A pair of corresponding I-shaped positioning projections (engaged portions) 2d and a pair of rectangular positioning projections 2d, which fit in the recesses 3d and 3d, respectively are formed on the outer surface of the holder 2 (only the upper side of the I-shaped projections and the right-hand side, when viewed in front of the support member 1a, of the rectangular projections are shown in the drawing).

Figure 4:
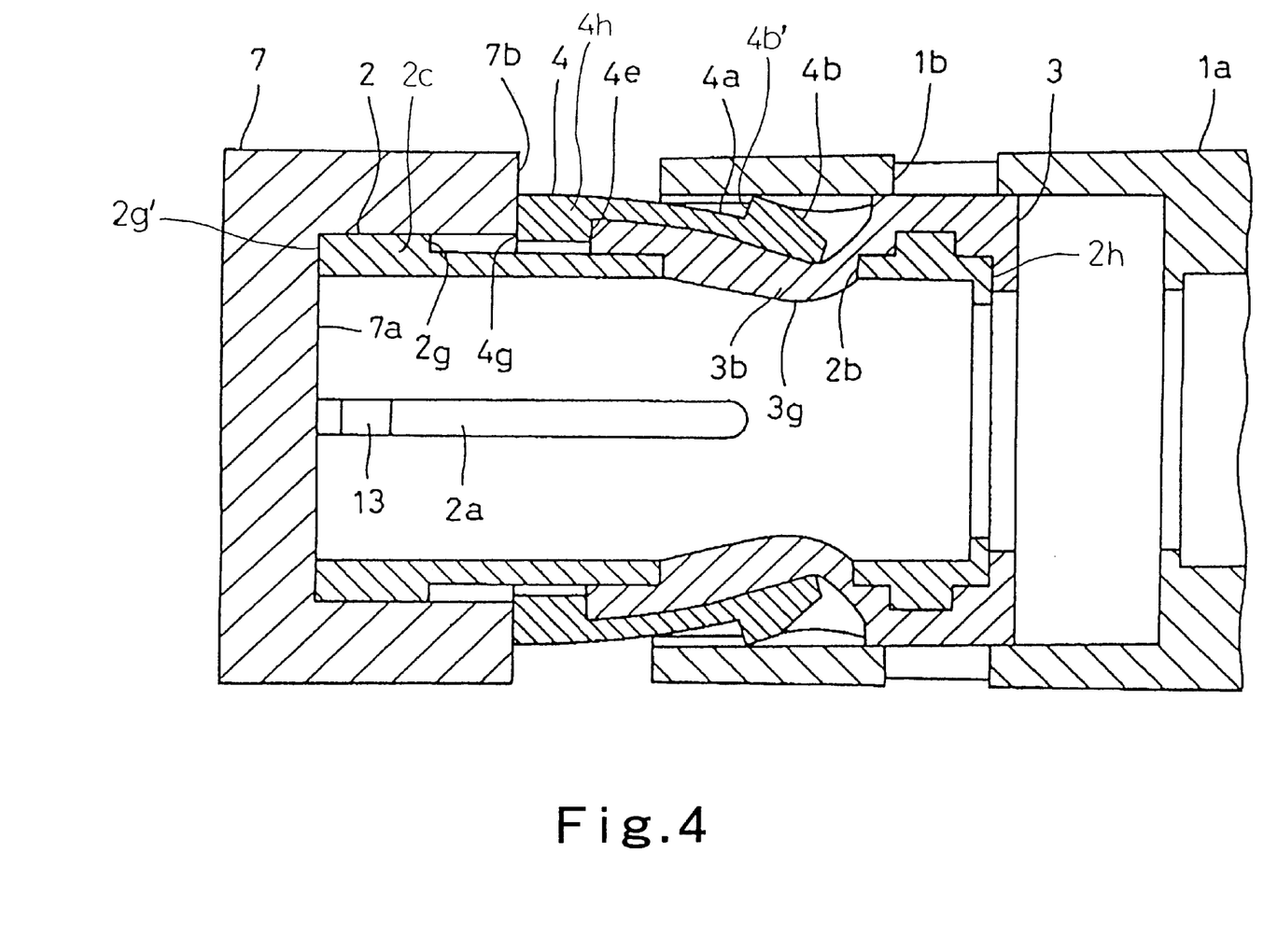
FIG. 4 is a horizontal sectional view showing the state of assembling the joint mechanism when the clamp and other parts are being inserted into the support member.

The holder 2 has a pair (only the right-hand side is shown) of rectangular relief holes (through holes) 2b formed therein corresponding in location to the arms 4a of the clamp so that, in case the arm 4a is deflected inwardly when the engagement hook 4b of the clamp engages with the engagement hole 1b of the support member, a portion of the damper 3 which makes contact with the arm 4a deflects inwardly in the relief hole 2b (FIG. 4). Engagement lock projections 3b (only the left-hand side is shown in FIG. 2), of which a protruding end face 3g (in FIGS. 3, 4 and 5) becomes substantially flush with the outer surface of the rod 10 when engaged in the relief hole 2b and the rod 10 is inserted (FIG. 5), are formed on the inner surface of the damper 3 corresponding in location to the relief holes 2b of the holder 2. The holder 2 also has flanges 2e, 2f being formed adjacent a slit 2a which is formed in the axial direction wherein a bolt (for example a hexagonal socket head bolt) 13 which is set in a through hole (not shown) formed in the flange 2f is screwed into a threaded hole (not shown) formed in the flange 2e (located on the right-hand side in the drawing), thereby to hold the rod 10 detachably onto the holder 2.

The support member 1a is preferably made in a tapered configuration as the outer diameter thereof increases toward the side of the power unit A, namely the base side (the right-hand side in FIG. 2) and the inner diameter decreases toward the base side for the reason of forming the casing 1 in a die. Because the outer surface of the damper 3 makes contact with the inner surface of the support member 1a, the damper 3 is also preferably made in such a tapered configuration, and the outer diameter decreases toward the base (the right-hand side in FIG. 2). In order to ensure tight engagement with the inner surface of the support member 1a, the outer surface of the damper 3 preferably has a plurality of projections 3e of, for example, rectangular configuration formed on the base side and the working unit B side (namely on the near left-hand side in FIG. 2) being distributed in the circumferential direction.

Now the operation/working effect of the joint mechanism, namely assembly of the joint mechanism, attaching and detaching the rod 10 and disassembly of the joint mechanism will be described below. For the ease of drawing, tapering of the inner surface of the support member 1a and tapering of the outer surface of the damper 3 are not shown in FIGS. 3, 4 and 5. When assembling the joint mechanism, as shown in the horizontal sectional view of FIG. 3, the holder 2 is passed through the body 4h of the clamp 4, then the holder 2 is inserted in the damper 3 while expanding the damper 3, using the elastic properties of the damper 3. In order to prevent the clamp 4 from coming off the tip 2c (on the left-hand side in FIG. 3) of the holder 2, inner diameter D of the body 4h of the clamp 4 is preferably made smaller than the outer diameter d of the tip 2c of the holder 2 where the flanges 2e, 2f (shown in FIGS. 1, 2) are formed. The body 4h of the clamp 4 has grooves 4d, 4d₁ formed on the inner diameter wherein the positioning projections 2d, 2d₁, on the outer surface of the holder 2 can pass through (FIG. 2).

The positioning projections 2d, 2d₁ on the outer surface of the holder 2 are fitted in the holder positioning recesses 3d, 3d₁, on the inner surface of the damper 3, thereby positioning the holder 2 both in the circumferential direction and axial direction and integrating the holder 2 with the damper 3. At the same time, the engagement lock projection 3b provided on the inner surface of the damper 3 is fitted in the relief hole 2b of the holder 2, whereupon a base end face 2h of the holder 2 makes contact with an inner surface 3h at the base end of the damper 3. Further, the arms 4a of the clamp are inserted (fitted) in the axial direction in the recesses 3a for positioning in circumferential direction of the clamp provided on the outer surface of the damper 3. In order to make it easier to insert the engagement hook 4b of the clamp in the support member 1a (FIG. 4), it is preferable that the amount of outward projection H in the radial direction decrease toward the base end 4f (right-hand side in FIG. 3) and become zero at the base end 4f.

The holder 2, the damper 3 and the clamp 4 which are integrally combined are inserted in the support member 1a by using a jig 7 of bottomed cylinder configuration as shown in FIG. 4. That is, an outer end face 2g' of the tip 2c of the holder 2 is pressed with an inner bottom face 7a of the jig 7 and, at the same time, an outer end face 4g of the body 4h of the clamp 4 is pressed with a side end face 7b of the jig 7, thereby inserting the holder 2, the damper 3 and the clamp 4 in the support member 1a. At this time, the damper 3 is pushed by the holder 2 which is integrated therewith, and is also pushed by an inner end face 4e of the body 4h of the clamp 4. Although an inner end face 2g of the tip 2c of the holder 2 and the outer end face 4g of the body 4h of the clamp 4 are separated at a distance so as not to contact each other in the configuration of the joint mechanism of this embodiment, a configuration may also be employed where these end faces are in contact with each other, and only the outer end face 2g' of the tip 2c of the holder 2 is pushed by means of a jig of a simple plate shape, thereby inserting the holder 2, the damper 3 and the clamp 4 in the support member 1a. Because the holder 2 is positioned in the circumferential direction with respect to the support member 1a by means of the damper 3 by fitting the recesses 3c for positioning in the circumferential direction on the outer surface of the damper with the projections 1c for the positioning of the damper 3 in the circumferential direction provided on the inner surface of the support member 1a of FIG. 2, the slit 2a of the holder can be positioned at a specified position (downward in this case) in the circumferential direction with respect to the support member 1a, namely the casing 1, as shown in FIG. 1.

When the engagement hook 4b of the clamp is inserted in the support member 1a as shown in FIG. 4, the clamp arm 4a is pushed inwardly in the radial direction by the inner surface of the support member 1a and is deflected inwardly. A portion of the damper 3 which is in contact with the arm 3a is also deflected inwardly and enters the relief hole 2b of the holder. Further, the projected end face 3g of the engagement lock projection 3b of the damper which is fitted in the relief hole 2b deforms by deflecting more inwardly than the inner surface of the holder 2. Thus because the arm 4a is deflected inwardly, it is made easier to insert the holder 2, the damper 3 and the clamp 4 which are combined integrally in the support member 1a.

When the tip 4b' (on the left-hand side in FIG. 4) of the engagement hook 4b of the clamp reaches the engagement hole 1b of the support member, as shown in FIG. 5, the clamp arm 4a which has been deflected returns outward due to elasticity of itself and the damper 3 so that the engagement hook 4b of the clamp engages with the engagement hole 1b of the support member. Because the clamp arm 4a is fitted in the recess for positioning in the circumferential direction of the clamp on the outer surface of the damper 3 and is positioned in the circumferential direction with respect to the support member 1a of the casing via the damper 3, it is made easier to engage the engagement hook 4b of the clamp with the engagement hole 1b of the support member. At this time, the base end face 3f of the damper 3 makes contact with the inward base end face if of the support member 1a (FIG. 5).

In this state, engagement of the engagement hook 4b of the clamp with the engagement hole 1b prevents the clamp 4, the damper 3 and the holder 2 from unintentionally separating from the support member 1a, thus completing the assembly of the joint mechanism. Therefore, according to the joint mechanism of the embodiment, the joint mechanism can be easily assembled simply by inserting the clamp 4 together with the holder 2 and the damper 3 into the support member 1a of the casing and causing the engagement hook 4b of the clamp to engage with the engagement hole 1b of the support member.

In the joint mechanism assembled as described above as shown in FIG. 1, the tip 2c of the holder 2 with the flanges 2e, 2f formed thereon protrudes from the support member 1a, thereby enabling it to attach or detach the rod 10 to or from the holder 2 freely by tightening or loosening the bolt 13. The support member 1a of the casing supports the output shaft 11, which is linked to the clutch drum 14 of the engine, freely rotatably by means of the bearing 12 at the portion of power unit A side in the axial direction, namely the base end side (right-hand side in FIG. 1) in a conventional manner. The output shaft 11 has a hollow space inside into which a base end of the drive shaft (not shown) which is disposed freely rotatably in the rod 10, is inserted. The drive shaft is linked by means of a spline or the like to the output shaft so as to be rotatable along with the output shaft 11.

FIG. 5 shows a horizontal sectional view of the joint mechanism when the rod 10 is inserted. In this state, because the protruding end face 3g of the engagement lock projections 3b becomes substantially flush with the outer surface of the rod 10 and the arm 4a is difficult to deflect inwardly, the engagement hook 4b of the clamp does not accidentally come off the engagement hole 1b of the support member, thus making the assembly of the joint mechanism and holding of the rod 10 in the support member 1a more secure.

In order to disassemble the joint mechanism for servicing the engine or other part, first the rod 10 is removed from the holder 2. Then while pressing the engagement hooks 4b of the clamp inwardly from the engagement holes 1b of the support member 1a, the holder 2 is pulled by holding the tip 2c thereof to release the engagement hooks 4b of the clamp from the engagement holes 1b into the state shown in FIG. 4 (the jig 7 is not necessary). By continuing to pull the holder 2 toward the tip side, the damper 3 and the clamp 4 together as a whole can also be pulled out of the support member 1a. Thus, according to the joint mechanism of the illustrated embodiment, the joint mechanism can be easily disassembled simply by releasing the engagement hooks 4b of the clamp from the engagement holes 1b, without need of unscrewing a plurality of screws and without removing a lid member.

As described above, the joint mechanism for the mowing machine of the present invention can be easily assembled and disassembled. The joint mechanism can be assembled simply by inserting the clamp 4, the holder 2 and the damper 3 into the support member 1a of the casing 1 and put the engagement hooks 4b of the clamp into engagement with the engagement holes 1b of the support member, and the joint mechanism can be disassembled simply by releasing the engagement.

What is claimed is:

1. A joint mechanism for a mowing machine, said machine having: a cylindrical, support member formed on a casing of a power output section at an output shaft protruding side of a power unit and extending in an axial direction, said joint mechanism comprising:

a cylindrical holder insertable in the support member and adapted to receive a rod which is insertable in the holder and is held in the holder by clamping to the holder, a cylindrical damper, provided separate of said holder to receive the holder therein which prevents vibration of the power unit from being transmitted to the rod and a clamp, provided separate of said damper, which prevents the damper from unintentionally separating from the support member, insertable in the support member; and said clamp comprises a flexible arm extending in said axial direction of the cylindrical support member and an engagement hook formed at an end of said arm, and wherein the support member has an engagement hole engaged by said engagement hook of said clamp when said clamp is inserted in said support member.

2. The joint mechanism for a mowing machine according to claim 1, wherein: said support member comprises an engaging portion for positioning of the damper in the circumferential direction which is formed on an inner surface of said support member; said damper comprises an engaged portion for positioning said damper in the circumferential direction which fits said engaging portion and is formed on the outer surface of said damper; and wherein a recess is formed on the outer surface of said damper for positioning of said clamp flexible arm in the circumferential direction.

3. The joint mechanism for a mowing machine according to claim 1, wherein said holder defines a relief hole formed therein so that when said arm of said clamp is deflected inwardly when said engagement hook of said clamp engages with said engagement hole of said support member, a portion of said damper which makes contact with said arm of said clamp is deflected inwardly in said relief hole.

4. The joint mechanism for a mowing machine according to claim 3, wherein an engagement lock projection is formed on the inner surface of said damper and is provided with a protruding end face which becomes substantially flush with an outer surface of said rod when said projection is engaged in said relief hole and the rod is inserted.

5. A joint mechanism for a mowing machine, said machine having a cylindrical support member formed on a casing of a power output section at an output shaft protruding side of a power unit and extending in an axial direction, said joint mechanism comprising:

a cylindrical holder inserted in the support member and a rod which is inserted in the holder and is held in the holder by clamping the holder, a cylindrical damper, which prevents vibration of the power unit from being transmitted to the rod and holder and a clamp which prevents the damper and the holder from unintentionally separating from the support member, are inserted in the support member; and said claim comprises a flexible arm extending in said axial direction of the cylindrical support member and an engagement hood formed at an end of said arm, and wherein the support member has an engagement hole engaged by said engagement hook of said clamp when said clamp is inserted in said support member, wherein an engaging portion for positioning of said holder in the circumferential direction and in the axial direction is formed on an inner surface of said damper, and an engaged portion for positioning which fits said engaging portion is formed on an outer surface of said holder.

\* \* \* \* \*